United States Patent [19]

Manzolini

[11] E Patent Number: Re. 33,450

[45] Reissued Date of Patent: Nov. 20, 1990

[54] DYNANOMETER ENGINE PERFORMANCE ANALYZER SYSTEM

[76] Inventor: David P. Manzolini, 201 Mill St., Rome, N.Y. 13440

[21] Appl. No.: 457,304

[22] Filed: Dec. 26, 1989

Related U.S. Patent Documents

Reissue of:

[64] Patent No.: 4,870,585
Issued: Sep. 26, 1989
Appl. No.: 107,168
Filed: Oct. 13, 1987

[51] Int. Cl.[5] ..... G01M 15/00; G01L 3/24

[52] U.S. Cl. ..... 364/431.03; 73/117; 73/116; 73/862.17; 73/117.3; 73/862.08

[58] Field of Search ..... 364/431.03, 431.04, 364/431.07, 431.01, 431.02; 73/116, 117, 117.3, 862.08, 862.17, 862.18, 862.23, 862.24, 862.28

[56] References Cited

U.S. PATENT DOCUMENTS

| | | | |
|---|---|---|---|
| 3,729,989 | 5/1973 | Little | 73/852.28 |
| 3,890,832 | 6/1974 | Nick et al. | 73/116 |
| 3,942,365 | 3/1976 | Hanson et al. | 73/116 |
| 4,327,578 | 5/1982 | D'Angelo | 73/862.18 |
| 4,638,673 | 1/1987 | Blaschke | 73/862.17 |
| 4,691,288 | 9/1987 | Kay et al. | 73/116 X |

*Primary Examiner*—Eugene R. LaRoche
*Assistant Examiner*—Seung Ham
*Attorney, Agent, or Firm*—Wall and Roehrig

[57] ABSTRACT

A dynamic engine performance analyzer system measures engine torque and power continuously from an absorption brake and produces a statistically corrected and deskewed value of torque and power for each of a number of RPM bands. Torque and power values are integrated during each N shaft revolutions as the engine is slowly accelerated through a range of interest. The data are accumulated such that for each 100 RPM wide band in the range, there is a statistical mean value produced of torque and of power. Each 100 RPM band element represents the mean or average of several separate data measurements. A deskewing operation compensates for the fact that the samples may not all be taken evenly throughout each 100 RPM average band during acceleration. The inertial effects of acceleration and deceleration are compensated by adjusting the torque and power values upwards during acceleration and downwards during deceleration. The engine analysis is quite rapid, and provides extremely reliable and accurate performance data which closely approaches the theoretical best possible according to statistical theory.

21 Claims, 5 Drawing Sheets

TRADITIONAL SINGLE POINT RPM DYNO DATA

DYNANOMETER ENGINE PERFORMANCE ANALYZER SYSTEM

Matter enclosed in heavy brackets [ ] appears in the original patent but forms no part of this reissue specification; matter printed in italics indicates the additions made by reissue.

BACKGROUND OF THE INVENTION

This invention relates to dynamometers, and is more particularly directed to a system for automatically measuring and recording engine torque and horsepower over a range of engine speed values, so that the performance characteristics of an engine can be determined.

Existing dynamometer instrumentation systems operate according to a basic principle. An engine is brought to a predetermined engine speed and stabilized at a given RPM while holding a torsional load on the engine's rotary output shaft. The engine torque value and the RPM value are recorded, either manually (with pad and paper) or electronically. Then the engine is brought to another engine speed and stabilized, and the torque and engine speed values are recorded. This is a rather slow process, so usually there are no more than about 5 or 6 data points taken. This usually means recording only a single torque value for every 500 RPM over a very narrow speed band.

Computer controlled instrumentation has been employed in connection with this general method. Unfortunately, the method still involves taking a very limited number of data samples, and then over widely separated RPM values. This yields simple point value readings, as before. This method is subject to wide variances from one test run to another, and this is largely due to statistical fluctuations of the measured data. The previous method more or less assumes an engine that delivers smooth, steady power during every aspect of a power cycle. In a real internal combustion engine, however, the power is produced in pulses (during the power strokes) with each cylinder contributing zero or negative values of torque being applied during intake, exhaust and compression strokes. Each engine stroke will be inconsistent from cycle to cycle, producing natural fluctuations in the torque impulses. As should be understood from this, the torque, power, and RPM delivered from the engine shaft vary even during steady state conditions. Consequently there is a rather large uncertainty factor in the prior art method readings. This uncertainty can be on the other of about 1% reading.

Attempts to measure torque (and power) during engine acceleration have not presented reliable and consistent results. The reasons for this have not been appreciated, even though in hingsight it might seem obvious. The engine and the dynamometer have rotational inertia, and this absorbs some of the engine torque when acceleration takes place. The rotational inertia releases power and torque when the engine is decelerated. Consequently, torque and power readings are below the true values during acceleration, but above them during deceleration. This variation is a simple first order relationship, the torque loss owing to acceleration being directly proportional to the amount of acceleration. There is one other factor limiting the reliability and accuracy of the results during an acceleration test run. Conventional instrumentation techniques obtain data by taking quick "samples" of the signal and rely on having this signal being filtered to smooth out the torque pulses and other fluctuations. However, this filtering also causes the signal to lag behind during changes and engine accelerations thus creating a false and misleading result.

OBJECTS AND SUMMARY OF THE INVENTION

It is an object of this invention to provide a dynamometer system which overcomes the drawbacks of the prior art.

It is a more specific object of this invention to provide a dynamometer system which produces a statistical torque and/or power measurement which is highly repeatable and is significantly more accurate and reliable and much more representative of actual engine performance than the prior art techniques.

It is a further object of the invention to provide a dynamometer system in which the measurements of torque and/or power are taken while the engine is undergoing acceleration or deceleration as well as during steady state conditions.

It is a still further object of the invention to provide a dynamometer system in which the values of torque and power can be found and listed with accuracy over a rather wide range of engine speeds.

It is a still further object of this invention to provide a dynamometer system in which the values of engine speed, when torque or power is measured, are known to rather high accuracy, preferably on the order of about $\pm 1$ RPM.

It is a yet further object of the invention to be able to adjust the statistical average values of torque or power to account for the average engine speed being above or below the center of a listed RPM band to effectively cancel the inconsistencies of manual dyno control.

According to an important aspect of the present invention, an engine dynamometer instrumentation and engine performance analyzer system has been designed to be practical, accurate, and simple to use. The system carries out at least five functions which have not previously been incorporated into any prior dynamometer systems:

For purposes of this specification, we may define "SAMPLE" to mean the data value obtained by a pure mathematical integration of the data signal over a period that corresponds to a whole number N of engine cycles. This is, if $N=4$, there will be four complete cycles or pulses of power for each cylinder, and the sample will have a value that corresponds to the mean or integrated average. The variance from one sample to the next will be smaller than that from one engine cycle to the next, and certainly less than from one point value to another point value.

(a) This system continuously samples the values of torque, RPM, and other data while the tested engine is accelerated, decelerated or in steady state and the values within each given RPM band are statistically averaged. Power is calculated after measurements of torque and RPM. The resulting value is more accurate than the previous technique by the square root of the number of samples in that range.

(b) To account for the "noise" or power pulses of the engine, the samples are each taken over an even integral number of complete revolutions continuously. Each sample represents exactly the same number of power strokes. The time is measured over this interval and the engine speed is derived with extreme accuracy, on the order of ±1 RPM.

(c) A deskewing process is carried out for each engine speed band. This accounts for the fact that not all of the torque samples are evenly distributed within the band. The average RPM speed for each band is stored together with the total number of samples in the band and the statistical average torque and/or power value. The slope, or the change of torque per RPM is found from comparing the values in the previous and next RPM band. This is multiplied by the difference between the band average engine speed and the band center speed, yielding a deskewing adjustment to be added to the previously mentioned statistical average torque or power value. This yields a corrected or deskewed value of high accuracy and reliability.

(d) An inertia factor is empirically derived and is used to account for errors in torque and/or power due to acceleration and deceleration of the engine. During the test, the engine speed derived in (b) above is compared with the engine speed for the next previous sample. The difference in engine speed which represents acceleration or deceleration is multiplied by the above factor and the product is added to the measured torque and/or power. The factor is the same for deceleration, which is simply acceleration at a negative rate.

(e) This system finally lists the resulting averages of the data over a wide band of engine speeds, determined by the test, which is usually conducted over the speed range used in the final application. This final data average is very representative of the performance expected of the engine in the end application.

The results of the above are automatically listed, either by a computer printer, on a screen, on a plotter, or with a similar device, so that the engine characteristics can be known and compared. The usual adjustments are made for temperature, pressure, and absolute humidity, and a record is also made of exhaust temperature, engine temperature, and fuel consumption rate, so that the engine test conditions can be repeated as exactly as possible.

The high accuracy of the torque and power measurements, and the use of narrow RPM bands (e.g. 100 RPM or 250 RPM wide) is extremely important for racing engines, for example, where small differences in performance characteristics can be critical. Also, for adjusting the fuel injectors of diesel engines, it is desirable to know the torque/RPM and power/RPM curves as exactly as possible as well as the (brake specific fuel consumption (BSFC).

The equipment for carrying out this technique is relatively inexpensive and uncomplicated, and can be used by technicians with only ordinary dynamometer expertise.

The above and many other objects, features, and advantages of this invention will be more fully understood from the following description of a preferred embodiment, when considered in connection with the accompanying drawing.

DETAILED DESCRIPTION OF A PREFERRED EMBODIMENT

Figure 1:
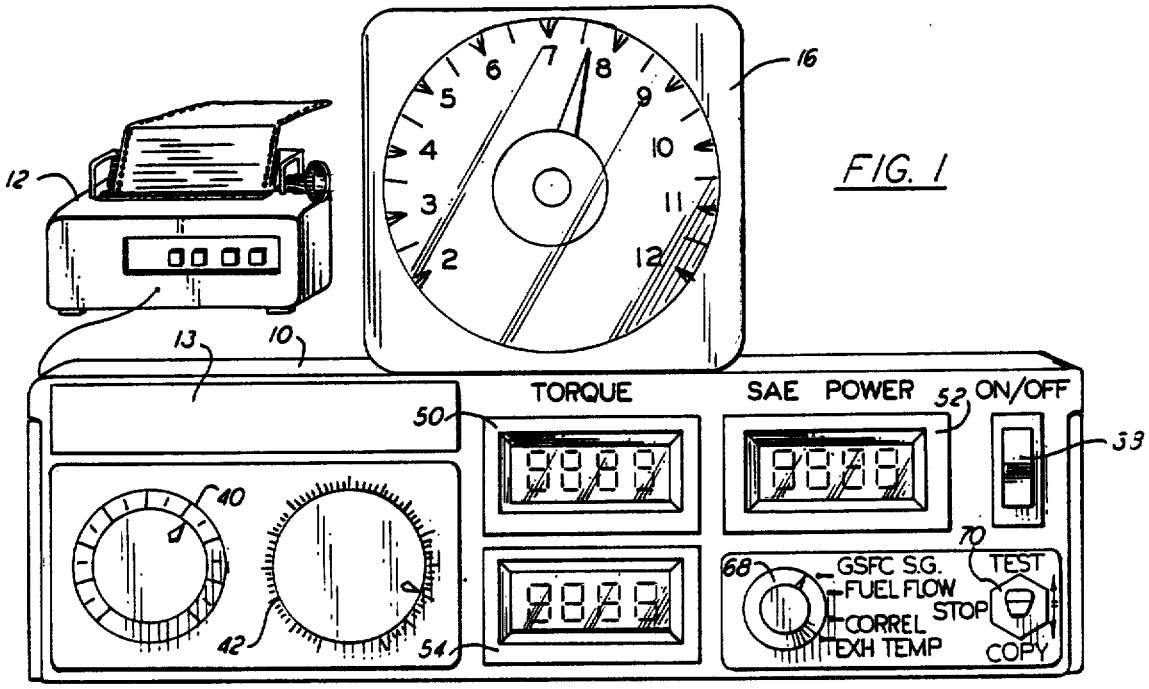
FIG. 1 is a front elevational view of the apparatus according to one embodiment of this invention.
Figure 2:
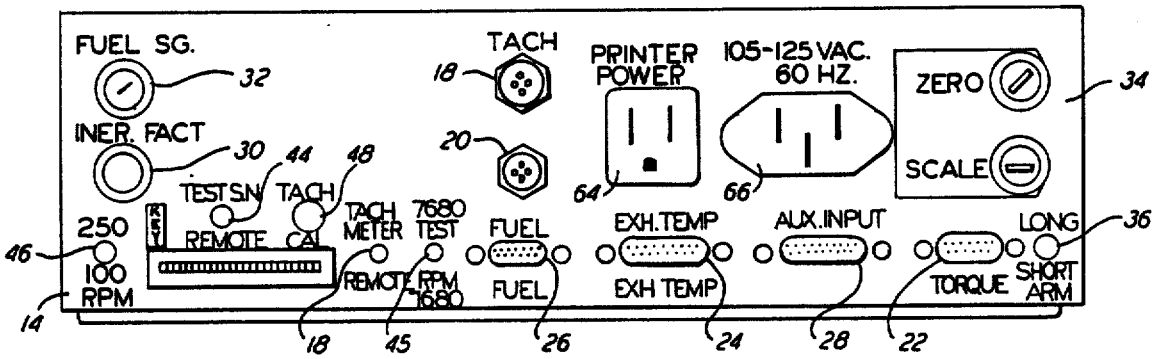
FIG. 2 is a rear elevational view of the apparatus.

With reference to the drawing, and initially to FIGS. 1 and 2 thereof, the equipment for this apparatus includes a processor/display unit 10, an 80-column dot matrix printer 12, and an electric tachometer indicator 16, here with a four-inch diameter scale. The unit has a front panel 13 (FIG. 1) and a rear panel 14 (FIG. 2). A tachometer sensor input 18 connects the processor display unit 10 to a tachometer sensor 18s, (see FIG. 3) that replaces the more conventional mechanical tach drive adaptor. Here a magnetic or optical sensor produces a predetermined number of pulses for each complete shaft rotation, to detect when an engine shaft has rotated 360 degrees to a home position.

A remote inlet air temperature probe coupling 20 connects to a temperature probe (not shown) and provides the system with air temperature information for computing an SAE correction factor. A torque sensor 22s, attached to the torque arm of an absorption brake, of either water or electric type, connects to a torque sensor input coupling 22. The exhaust temperature probes 24s, attached to the engine exhaust manifold, connects to an exhaust temperature input coupling 24. An engine fuel flow sensor 26s sends fuel flow information to a coupling 26 of the device. An auxiliary input 28 allows additional information to be supplied automatically to the processor display unit 10. This input 28 can be connected, for example, to an air flow sensor connected to the carburetor or to the intake manifold of the engine.

An inertia factor adjustment 30 allows empirical adjustment to be made to compensate for the effects of acceleration or deceleration of a given engine. A fuel specific gravity adjustment 32 is located just above the inertia factor adjustment 30. Torque zero setting and scale adjustments 34 are also disposed on the processor/display unit rear panel 14. An arm select switch 36 can be set for either a short or long torque arm of one particular style of brake. An on/off switch 38 is disposed on the front panel 13 of the processor/display unit 10, and relative humidity and barometric pressure adjust setting knobs 40 and 42 allow the torque and power adjustments to be SAE adjusted for pressure and relative humidity conditions.

A result test switch plugs into a switch jack 44. This switch can be actuated to commence a test run, and released to end the test run. A band select switch 46 allows the RPM bands or intervals to be printed [on] *out* at 100 RPM or 250 RPM. A tachometer test source switch 45 provides a precise signal that corresponds to an engine speed of 7680 RPM. This is used for calibrating the tachometer using a control 48 to set the tach reading to the calibration mark.

On the front panel 13 of the processor/display unit 10 there are a digital torque display 50, an SAE corrected power display 52, and an auxiliary display 54.

Figure 3:
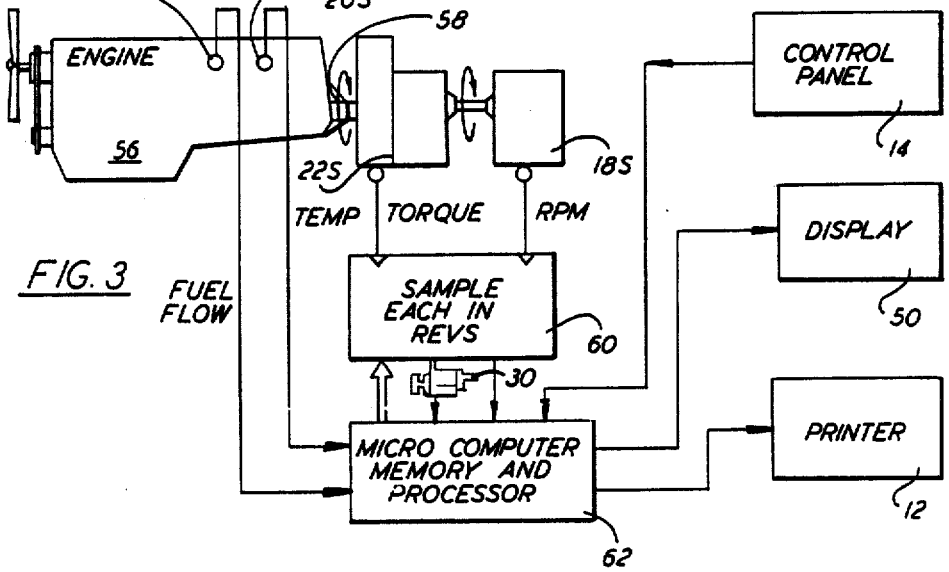
FIG. 3 is a schematic system diagram of the apparatus of this invention.

As shown schematically on FIG. 3, an engine 56 to be tested has its drive shaft 60 coupled to an absorption brake which is attached to the torque sensor 22s and the tachometer 18s, which provide torque and rotation speed information to a data integrator circuit 60 that is situated in the processor/display unit 10. A microcomputer memory and processor unit 62 is also located within unit 10, and is coupled to the data integrator circuit 60 as well as to the controls in the front panel 13 of the processor/display unit 10. The memory and processor unit 62 is also coupled to the displays 50, 52, 54, and to the printer 12. As shown in FIG. 1, a power outlet 64 is provided for printer power, and an input filtered outlet 66 is provided to mate with standard power cords. A display select switch 68 sets the display 54 to indicate any of several engine conditions, and a test/copy switch 70 allows an operator to start and stop a test operation directly at the control panel as well as print a copy of the most recent test.

The system has been designed to be practical, accurate, and easy to use. An operator by using either a remote switch coupled to the jack 44 or the test switch 70, can operate all of the test functions possible, from a single line printout of power and torque at a given RPM to a complete data documentation over a wide range of engine speeds. The system employs a technique for securing statistically accurate and repeatable dynamometer results.

The system can accept and process up to six additional sensor inputs, and can communicate with other computers for further data processing and analyses, if desired. Also, the system in this embodiment is designed to operate over an engine speed range of 1,000 to 12,000 revolutions per minute.

To achieve the most accurate and repeatable results from a test, the normal precautions are taken to control the conditions that might affect the final results. Maintaining a consistent supply of inlet air to the engine and controlling the engine coolant and oil temperatures are essential for optimum test repeatability.

The controls on the front panel 13 function as follows. The power switch 38 controls the main power and also controls power to the printer outlet 64. Turning the power switch off and back on initializes the computer processor 62. The processor 63 remembers the last test run data and the last test number when the switch 38 is turned off.

When the test switch 70 is in its normal or "standby" position, the processor scans and displays data only. If the switch 70 is switched up for a test (which is the same as depressing a remote test button connected to the jack 44) the processor 62 begins to statistically accumulate data into its memory for printout when the switch 70 is returned to standby. Another test run can be started immediately after completing a previous test run, without waiting for the printer 12 to finish. The copy position of the switch 70 initiates the printer 12 to print another copy of the previous test run.

The torque display 50 displays the actual uncorrected torque as determined from the sensor 22s. This is needed for setting the zero offset, achieved by the controls 34, and for checking the dead-weight calibration setting. The power display 52 shows SAE corrected engine brake horsepower. The auxiliary display 54, in connection with the associated display select switch 68, displays any of the following data: Brake specific fuel consumption (BSFC), i.e., pounds per hour per brake horsepower, while the engine is running, but displaying the value of the fuel specific gravity when the engine has stopped; the fuel flow, that is the actual fuel consumption of the engine in terms of pounds per hour; the SAE correction factor, as derived from the barometric and humidity settings 40, 42 and from the air temperature input; and the exhaust temperature, in degrees F., when the engine is running, with the inertia factor (from the setting of the knob 30) being displayed when the engine is off. The tachometer scale calibration setting 48 adjusts for fine trimming of the tachometer scale calibration, and is used in connection with the test RPM switch 45.

Of the torque scale adjustments 34, the zero offset adjustment corrects for imbalance to the torque zero scale caused by hanging water hoses and by the torque arm weight. The torque scale adjustment is made after the zero offset has been checked. The fuel specific gravity adjustment 32 inputs the specific gravity (SG) of the fuel that is being used, so that the BSFC and fuel flow indications are correct for that test run. The SG factor is displayed on the auxiliary display 54 when the engine is stopped.

The inertia factor adjustment 30 allows for corrections to the torque and power results owing to the effect of rotational inertia of the engine and dynamometer systems on readings taken during engine accelerations and decelerations. During positive RPM changes, the system inertia will absorb torque, and during negative RPM changes, the system inertia will release torque. This affects the resulting measured torque. The optimum setting of the inertia factor is determined experimentally by making two test runs over the same RPM band, accelerating and then decelerating at aproximately the same rate, e.g. 200 RPM per second. The average torque results will be the same for both increasing and decreasing engine speed runs if the inertia correction factor is optimal. The front panel auxiliary display 54 will show a relative number between "0" and "250" for this inertia factor when the engine is stopped.

On the rear panel, the switch 46 selects whether the final printout will show the results at "100 RPM" or "250 RPM" intervals. The 250 position is used to compact the results without affecting the average results. Should a more detailed printout be required after the test has been printed at "250", the switch 46 can be set to "100" and the switch 70 depressed to the "copy" position for an expanded 100 RPM band printout.

The torque arm switch 36 is needed for Stuska Engineering dynamometers, and supplies the processor 62 with information as to which torque arm length is needed, "long" being 12.6 inches and "short" being 6.3 inches.

The system has the following operating characteristics: the RPM speed range, as exhibited on a page product from the printer 12, extends from about 1,100 to 12,000 RPM, at either 100 or 250 RPM intervals. The torque range depends on the sensor employed, and can be up to 2,000 foot pounds. The fuel flow sensor range is from 0 to 1,500 pounds per hour, at a specific gravity of 0.73, the fuel specific gravity range being from 0.60 to 1.05. The exhaust temperature range is from room temperature up to 1,700° F.

The engine analysis system of this invention can be used either in the traditional single point RPM mode or in the preferred sweeping acceleration mode.

In the traditional mode, the operator attempts to hold the engine 56 stable at a specific engine speed, and then momentarily moves the switch 70 to the test position. The printed resolution in this mode is 10 RPM. When the test switch is released, a single line of data is printed by the printer 12, showing the RPM, SAE torque, SAE brake horsepower, BSFC, exhaust temperature, and a sample number which indicates the total number of measurements that form the printed results. The longer the test switch is held, the more separate data measurements there are that are taken and averaged into that single one-line data printout.

In the sweeping or accelerating mode, a full use of the statistical and computational power of the computer processor 62 is employed. This method provides much more accurate and detailed information about the engine being tested in a much shorter time than does the traditional method. The procedure involves first selecting an RPM test band, such as about 5,000 to 7,000 RPM, and then fully loading the engine 56 below that test band, e.g. about 4,800 RPM. Then the load on the engine 56 is slowly reduced while the test switch 70 is in the test position, allowing the engine 56 to slowly increase speed over this band. Alternatively, the test can be initiated when the engine 56 is running faster than the test band, and decelerating the engine from a higher RPM to a lower RPM. The objective is to have the engine 56 accelerate or decelerate smoothly at about 100 RPM per second, and it is also important that the load change smoothly. The test switch 70 is released when the engine is brought through the desired RPM range, and before the engine is shut down. As soon as the test switch 70 is released, the printer begins to document all of the data accumulated into the 100 RPM (or 250 RPM) bands or intervals. Also provided are a formal heading, a test number, average correction factor, fuel specific gravity, and other data. Also, all of the data are averaged over the test band, and the averages are printed on a separate line. If several temperature inputs were used, these would be automatically printed in a following paragraph. The test number is automatically incremented.

A third mode can also be selected, in which groups of 100 RPM band lines are printed out, similar to the traditional or single line mode, but without incrementing the test number and without printing a complete heading and format.

In any of the above modes of operation, the system is immediately available for another test after a previous test is completed, even while the previous test data are being printed out.

This means that after a test run is made in the sweeping or continuous mode, a series of back-up test runs can be made in the traditional mode, more or less to verify the results. The system stores the data in memory, even if the printer 12 should run out of paper. This allows test runs to be made continuously, even while the printer 12 is being reloaded.

Other features which are not shown in detail include an interchangeable PROM or program chip which configures the system to the particular type of dynamometer being used i.e., Stuska, Clayton, Go-Power, etc. A battery backup permits the memory to store or recall the last test number and the associated data from the previous test run, even after the power switch 38 has been turned off.

A torque sensor, which can be either a strain gauge load cell or pressure transducer, is factory calibrated to provide torque readings of ±0.1%, and is furnished with the system as the torque sensor 22s. The fuel flow sensor 26s is one of four available sensors which cover a range of zero to 1500 pounds per hour at a specific gravity of 0.73. As for the tachometer sensor 18s, the system will accept engine speed inputs from several different sources, depending on the type of dynamometer used. The standard tach sensor 18s attaches directly to the SAE tach drive fitting mounted on the back of the standard absorption brake. As aforementioned, this provides a predetermined number of pulses for each rotation of the shaft, and it is possible simply by counting pulses to know when the shaft has rotated 360 degrees back to its home position.

The principle of operation of this system departs from the traditional concept of associating points of dynamometer data with predetermined engine RPMs. Instead, the system provides performance data, such as power and torque readings, which are statistically averaged over their associated RPM bands, such as a 100 RPM width band, and the printout provided by the printer 12 represents the statistical aggregate of all measurements taken within that band. This average data printed for each speed band is much more accurate and representative of engine performance than any single point measurement. Also, because the measurements are taken continuously, the entire range of engine speeds is covered in about the same time it takes to obtain one or two data points using the traditional method. This allows the operator to develop an accurate feed for actual engine performance, which relates more closely to racetrack performance. Readings from this system are highly repeatable with manually controlled dynamometers, whereas with the previous system it was rare to have two test runs yield the same results. The system automatically screens all of the incoming data and compensates for speed changes during acceleration or deceleration, and rejects data if the engine speed acceleration is faster than a predetermined amount, for example, ±350 RPM per second.

The technique of this invention involves sweeping or accelerating the engine smoothly through the desired range of RPMs of interest, while the system accumulates data continuously on actual performance of the engine at a rate of about ten samples per second. A typical test over a range of about 3,000 RPM, e.g., from 5,000 to 8,600 RPM (takes about 30 seconds) and makes 300 separate and accurate readings. The system analyzes these data and then prints the performance results in a standard format, as shown in [Appendix ] *Table* A. Test runs can be as narrow as about 300 RPM and still take full advantage of the powerful processing techniques employed with this invention. On the other hand, there is no maximum limit on the amount of data that can be accumulated, and the longer the test switch 70 is held in the "test" position, the more data that will be accumulated, and the closer the average will be to the actual engine performance characteristics.

*TABLE A*

| *DEPAC Sample Printout notes:* |
|---|
| *The attached sample data printout was obtained by sweeping an engine from 6700 to 9100 RPM, the test taking about 30 seconds. This printout started as soon as the test switch was released. Had there been more than one Exhaust Temperature probe used the printout would have continued, automatically, to printout up to 8 EGT's in a follow-on paragraph. (refer to 250 line Printout example).* |
| *TEST #: Each test run has a unique test number to arrange all tests in chronological, ascending, order. On power off the last test # is remembered, as well the last test run.* |
| *Average C.F.: This was the average Correction Factor, over the test run, computed and used to determine the SAE corrected Torque and BHP readouts.* |

*TABLE A-continued*

| *DEPAC Sample Printout notes:* |
|---|
| *Fuel S.G.: This is a reading of the rear panel setting for the Fuel Specific Gravity which is used to determine the Fuel flow (#/Hr) and the BSFC.* |
| *RPM BAND: As the engine sweeps through the speed range, DEPAC determines performance ratings and assigns them to RPM bands around the number printed. These performance figures for Torque, BHP, etc., relate more toward the true performance of the engine than data taken at a single RPM point.* |
| *# SAMP: The numbers printed in this column represent the total number of actual data samplings/readings which make up the actual printed results. The numbers also indicate just how the test was run.* |
| *AUX 1 Chan: The column prints data input into the auxiliary #1 channel, and in this example, represents a relative amount of airflow/cycle.* |
| *OIL/WATER Temperature: Two sensor probes are supplied and this column prints out the temperature in Deg F. from 100 to 300 Deg F., printing a blank if less than 100 Deg F.* |
| *AVERAGE RESULTS: This bottom line is considered the primary readout on engine performance, assuming the test was made over an RPM band which would be used at the track. Very small changes in performance can be seen here and these figures will generally indicate how the engine will perform at the Race Track, whether it is maximizing the Torque or Power over a Band. The average printout of the BSFC, Exhaust Temp. and the Aux #1 Channel will be a good indicator of the effects of changes made during a test program. The RPM Band printed (in 500 RPM steps) is determined by the engine RPMs the test began and ended with. If a Band between 7500 and 9000 RPM was required, then the engine would be swept from about 7300 to just over 9000 RPM, before releasing the test switch.* |
| *100 RPM or 250 RPM printouts* |
| *DEPAC can also print out data in 250 RPM increments, instead of 100 RPM increments, to form a more compact printout if desired. The 250 RPM mode can allow faster accelerations during the test. The 250 line printout includes a wider area band that still allows complete coverage of the area under the data curves. If a test is run in the 250 line mode you can still get a copy in the 100 line mode by simply switching the to 100 line mode and then pushing COPY, without any loss of information. The opposite is also possible.* |

Other features can easily be added to this system, such as a turbocharging monitor, a mass air flow sensor for measuring air consumption, a personal computer interface, which can include a fiber optic cable or current loop that plugs into an RS-232 port on the back panel 14 of the unit 10 and to a standard port on the personal computer, or other custom hardware/program enhancement to service almost any conceivable engine testing applicance.

In practice, an optimum sweeping rate has been established to be about 100 RPM per second. In this way, as aforementioned, a 3,000 RPM sweep band would consume about thirty seconds of time. Any longer test sweep will not significantly improve the overall accuracy of the test or improve the data performance. However, if the sweep is made faster than this, there is a risk that some of the test bands will have fewer than ten data samples. With this system, repeatability is better than ±0.11%, from each run to the next, so that any changes in data that are greater than this represent actual small changes in engine performance.

Figure 4A:
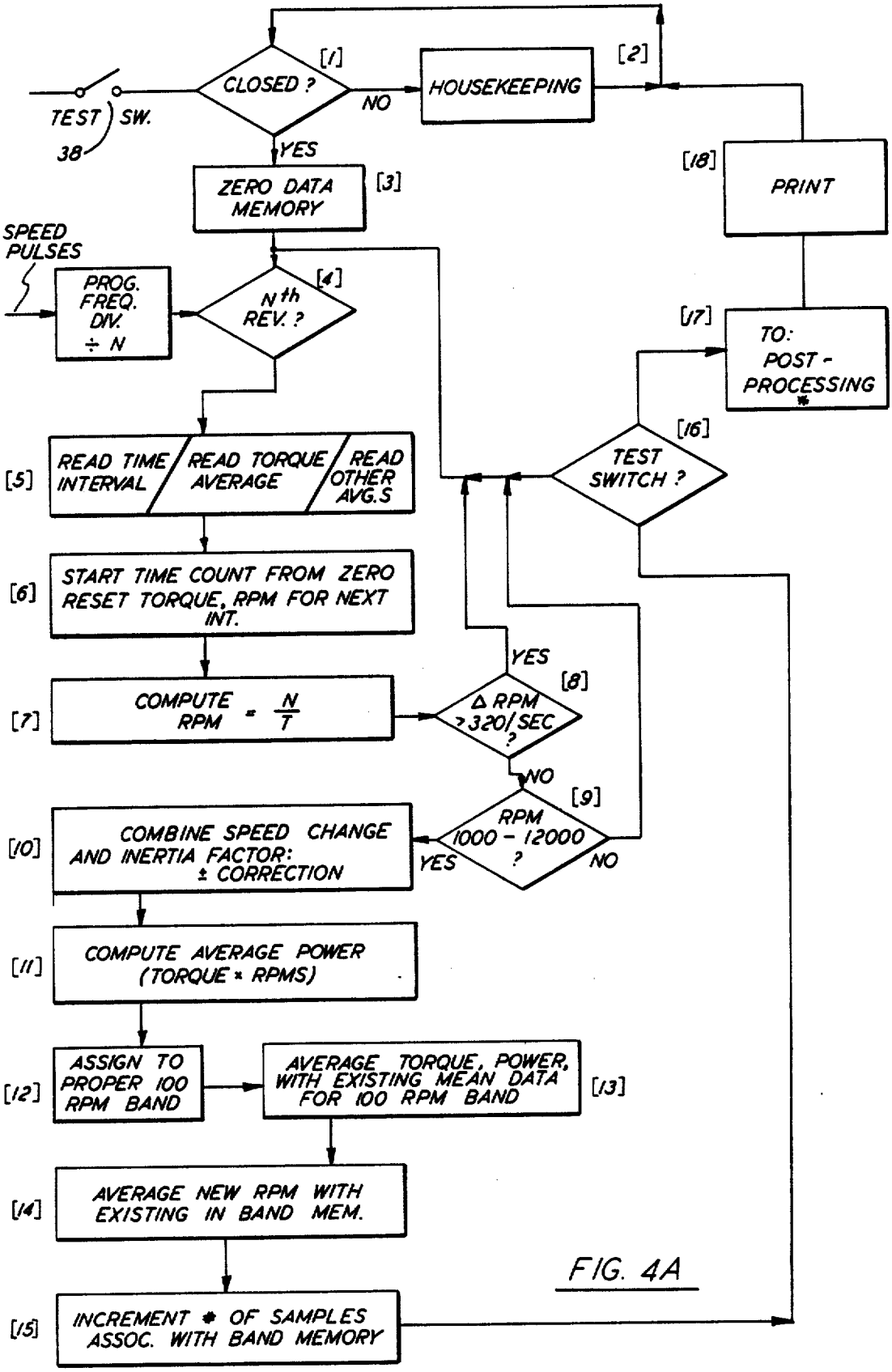
FIGS. 4A, 4B, and 4C are flow charts for explaining the operation of this invention.
Figure 4B:
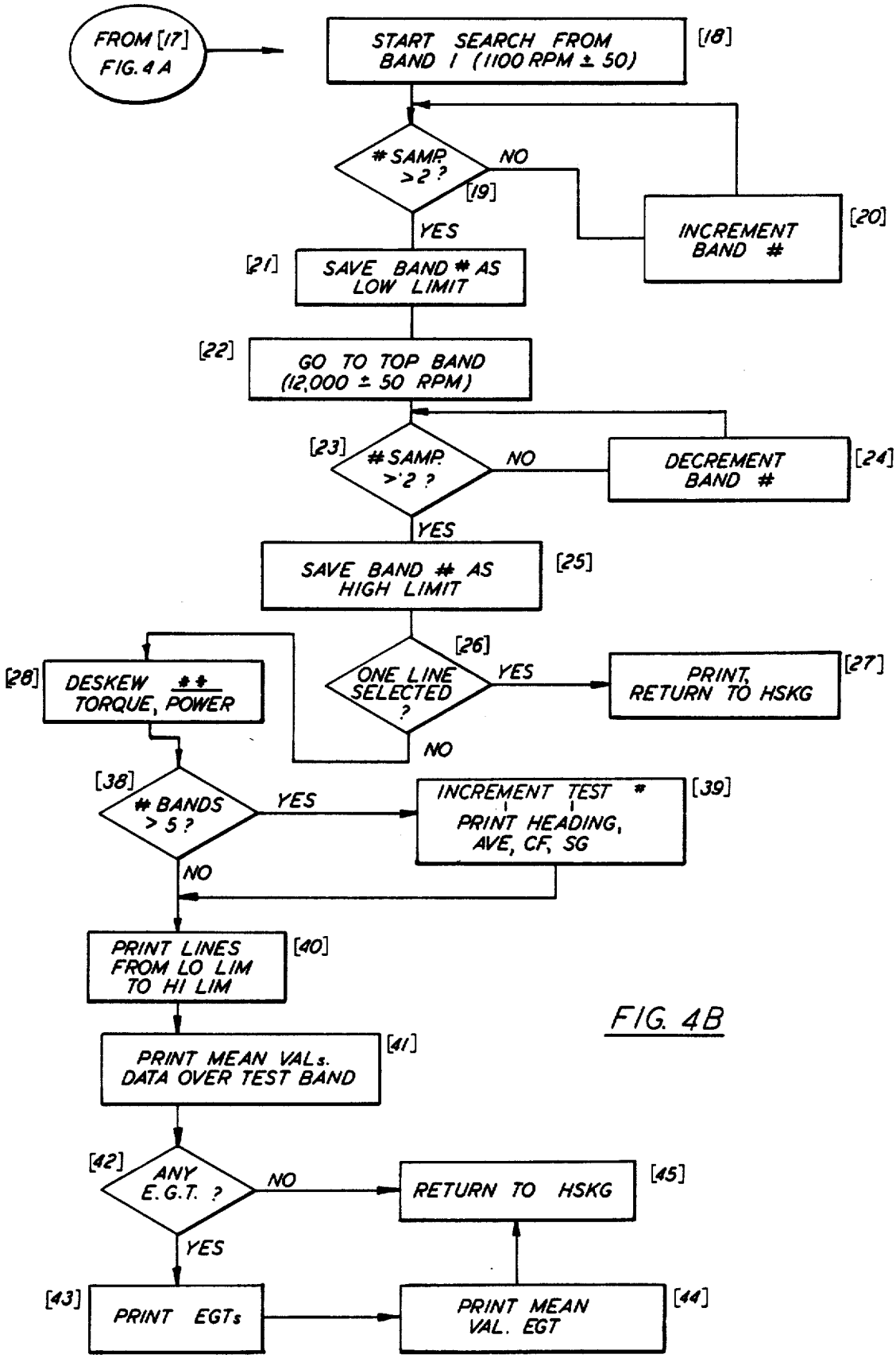

The statistical accumulating and averaging and deskewing of the engine performance data, that is, of the torque and power, are explained with reference to FIGS. 4A to 4B.

When the power switch 38 is turned on, the processor 62 initializes and monitors the test switch 70 to determine whether it has been actuated to its test position, as in block [1]. If not, the processor 62 proceeds with standard housekeeping routines (block [2]), but if so, the processor zeroizes or clears the data memory and registers, as in block [3] and waits for the occurrence of a pulse signifying the Nth revolution (block [4]). The processor 62 then commences counting precise clock pulses until the next pulse indicating another N revolutions have occurred. At that time, the clock count is held, and the torque average reading and other parameters are read into a temporary storage memory (block [5]), and the registers are reset (block [6]) to count clock pulses for the next interval and to measure the torque value for that interval. The clock information is processed to produce an engine speed (block [7]), which has an accuracy of ±1 RPM. This is significantly better than the engine speed that could be measured in the traditional fashion, that is, by measuring the number of revolutions over a fixed period of time. For a four-stroke gasoline or diesel engine, N should be an even integer (2, 4, . . . ) and in the preferred mode, N equals ten. For a low speed diesel engine N would be 4 or 6, and the program would work over a lower speed range, perhaps with narrower RPM bands. For a two-stroke engine, i.e., a high-performance outboard motor marine engine, N could be either odd or even. The object is to have an integral number of power strokes in each sample period.

This information is validated for excessive acceleration or deceleration, by comparing the RPM value with that from a next previous N revolutions, and if the resulting difference RPM is over 350 RPM (block [8]), the results are cancelled from memory. The results are next checked to see if they are in the target RPM range 1,000–12,000 RPM, as in block [9]. If the data are valid, the results are fed to the temporary storage memory. The speed change ΔRPM is multiplied by the inertia factor IF to find the correction factor (block [10]). While not specifically shown here, the inertial acceleration adjustment factor IF is now multiplied by the speed difference value a RPM and the product IF×ΔRPM is added to the sample torque value to compensate for the inertial effects to acceleration or deceleration. Power is computed from RPM and torque (block [11]). The particular RPM band associated with these data samples is identified, as in block [12]. In this invention, the term sample means the mathematical integration of the data signal over the time interval of N revolutions. It should be considered as the pure mathematical average of the signal over this time period.

During the continuous mode test run, the adjusted sampled torque value is combined with previously stored values for the same RPM band to develop RPM band running mean or average values of torque and calculated power, as in block [13]. The sampled torque and sampled RPM are multiplied to form the sampled power which is accumulated into running band averages just as with the torque results. Each sampled RPM value is also used in connection with previous sample RPM values to calculate and store an average RPM value for each of the 100-RPM bands (Block [14]). The number of samples for each 100-RPM band is counted and the accumulated number is stored, as in block [15]. After each operation, the test switch 70 is interrogated (block [16]), and if it remains actuated, the cycle is repeated; if not, a post-processing operation (block [17]) is carried out on the continuously accumulated torque and power values, after which the results are printed (block [18]). This is described in more detail with reference to FIG. 4B.

The "post processing" procedures generally commence by scanning the RPM range beginning with the lowest RPM band (block 18). The band is checked to see if there are more than two samples (block [19]) and if not the band number is incremented (block [20]), but if so the band number is stored as a lower limit (block [2]). Then the post-processing goes to the highest RPM band (block [22]), and checks to see there are over two samples in that band (block [23]). If not, the band number is decremented to go to the next band lower (block [24]) but if there are sufficient samples, the band number is stored (block 25]). These data provide the upper and lower limits of valid statistical data for the test run.

Figure 4C:
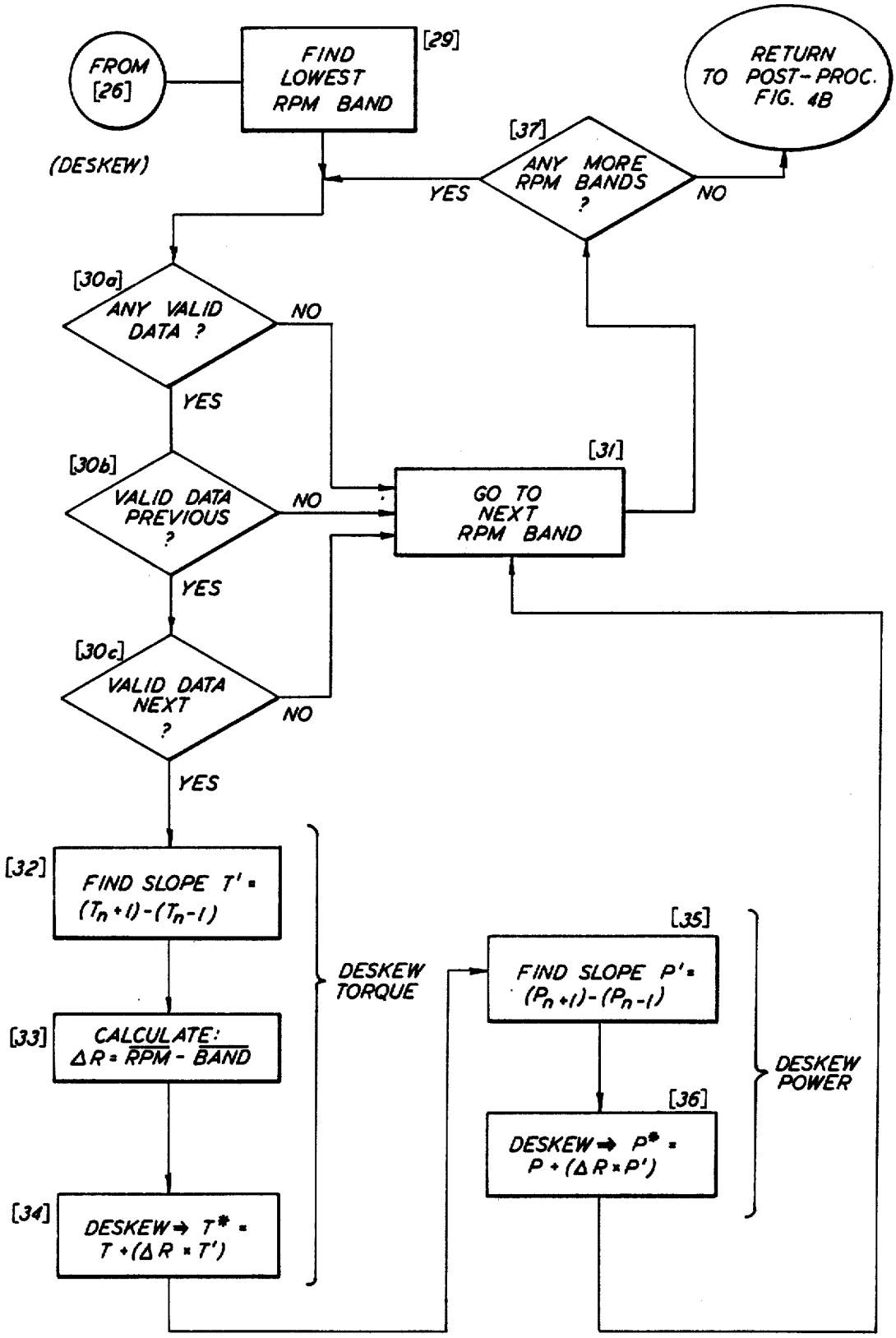

At this point the processor 62 checks to see if a one-line print mode has been selected, as in block [26], and if so proceeds to print the single line of results, as in block [27], after which the program returns to its housekeeping routine. If the single-line mode was not selected, the post-processing proceeds with a deskewing operation (block [28]), which is detailed in FIG. 4C.

In the deskewing process, the processor returns to the lowest RPM band, as in block [29]. The system checks to make sure that are valid data in the band, in the previous RPM band, and in the next RPM band, as shown in blocks [30a], [30b], and [30c]. If not, it automatically goes to the next RPM band as in block [31] and repeats the process. Because the deskewing requires three successive RPM bands, the deskewing is not carried out on the highest and lowest RPM bands. Because of this, the test should be started at least 100 RPM below the desired end of the range and should continue up at least 100 RPM above the top end of the target range.

The deskewing takes advantage of the fact that for small changes in engine speed, the changes in torque and power are almost linear, that is, they change smoothly and can be accurately represented as having a straight line slope. This would not necessarily be true if the separation between bands were wider, e.g., 500 RPM, but is is valid for RPM bands of 100 RPM. The object of the deskewing process is to correct the data to account for any changes in acceleration of the engine as it sweeps through the speed band. If the acceleration is constant, there is no skew as the number of data samples are distributed evenly throughout the band and the average of all the data can be considered to be centered in the band. But if, for example, the engine is increasing acceleration when sweeping through the band there will be more data samples below the midpoint than above, and therefore the data averages will be skewed downward along the slope of the data curve. The deskewing process effectively eliminates this common inconsistency of manual dyno operation eliminating the need for precise automatic control of the engine speed for accurate results. A factor is calculated and is used to shift the statistical average sample value of torque and calculated power to the value it would be expected to have if the engine acceleration was constant throughout this speed band interval.

The torque deskewing is carried out as shown in blocks [32] through [34]. First, the slope T′ is found from the difference between the statistical mean torque value for the band just above Tn+1 and the band just below Tn−1 the RPM band of interest (block [32]). Then the difference value $\Delta R$ is calculated between the band average RPM value $\overline{RPM}$ and the center of value BAND of the RPM band (block [33]). For example, for the engine speed band from 7250 to 7349 RPMs, the center value $\overline{BAND}$ would be 7300 RPM.

After this, a deskewing operation is carried out in step [34] and a deskewed value T* is obtained by adding the "raw" statistical average torque value T to the product of the RPM difference value $\Delta R$ times the slope in torque T′ as determined in block [32].

The values of power P are also deskewed, first of all as in block [35] by finding the slope P′ of the power function by taking the difference between the power of the next successive RPM band Pn+1 and the previous RPM band Pn+1, and calculating a deskewed power value P* as the sum of the raw statistical average power P and the product of the RPM difference value R times the slope P′ as in block [36].

After the deskewed values of torque T* and power P* are calculated and stored, the system automatically goes to the next higher RPM band as in block [31]. The process is continued as long as there is at least one more RPM band to be considered, as in block [37]. When the data have been deskewed for all of the RPM bands (except the very bottom and top), the system continues with post processing (FIG. 4B) and the results are eventually printed.

The normal printout of data is in 100 RPM wide bands, which effectively represents the average or area of the data curves within this band. If the printout is in the 250 RPM band position, the program averages several 100 RPM bands to form wider band averages, for no loss of information. The results can either be printed a second time if the switch 70 is actuated to the "copy" position, or another test run can be carried out if the switch 70 is actuated to its "test" position.

After the deskewing is completed as in block [28], if there are more than a predetermined number of 100 RPM bands (block [38]), the test run number is incremented, and the system prints out appropriate headings, correction factor, fuel specific gravity (block [39]). Then, as in block [40], regardless of the number of 100 RPM bands, the system will then print a line of data for each 100 RPM band, from the lower limit to the upper limit, the data including the deskewed torque and power, BSFC, exhaust temperature, oil or water temperature, and the results of the auxiliary channel (here the airflow per cycle), followed by the number of sample values taken for that RPM band. The system then prints the mean values of power, torque, and other parameters as averaged over the main part of the test run, e.g., from 7,000 to 9,000 RPM, as in block [41]. Thereafter, the system interrogates (block [42]) whether there are data being supplied from a remote exhaust gas temperature box (not shown) which can accommodate up to eight ungrounded thermocouple probes. If so, the system will then print out the individual values of the temperature from the several probes (block [43]), print out the average temperature (block [44]), and then (block [45]) will return to the housekeeping routines (block [2]).

The printed results of a typical test run are shown in [Appendix ] *Table* A. Here, the attached sample data printout was obtained by sweeping the engine 56 over a range of engine speeds from 6700 to 9100 RPMs. The test consumed about thirty seconds. The printout started as soon as the test switch 70 was released. The data printed out on the [Attachment ] *Table* A are more or less self-explanatory. Each test run has a unique test sequence number; in this case the test number is 27. The average SAE correction factor was 1.023 and the fuel specific gravity was 0.728. The correction factor was computed based on the temperature, pressure, and absolute humidity and used to determine the SAE corrected torque and brake horsepower. The specific gravity SG was used to determine the fuel flow in terms of pounds per hour as well as to determine the brake specific fuel consumption (BSFC). For each RPM band printed, the number # of samples is recorded. This provides a measure of the reliability of the data. The operator should try to obtain ten or more readings in each RPM band to keep the statistical error as low as possible. In this example, AUX 1 which identifies the number one auxiliary channel, represents the relative amount of air flow per cycle.

The overall run average torque, power, brake specific fuel consumption, exhaust temperature, and air flow over the main part of the test run are printed out at the bottom of the page as a single line summary. This line is considered the primary readout on engine performance, and assumes the test was made over an RPM band which would be used, for example, at a racetrack. Very small changes in performance can be seen here and these figures will generally indicate how well the engine will perform at a race track, and whether it is maximizing the torque or power over a given band. The average printout of BSFC, exhaust temperature, and the auxiliary channel (here, the air consumption) will indicate the effects of changes made during a test program. The overall span (to the nearest 500 RPM) is determined by the engine RPMs at the top and bottom of the test runs. For example, of a band between 7500 and 9000 RPM were required, the engine would be accelerated from about 7300 to about 9100 RPM before releasing the test switch.

Figure 5A:
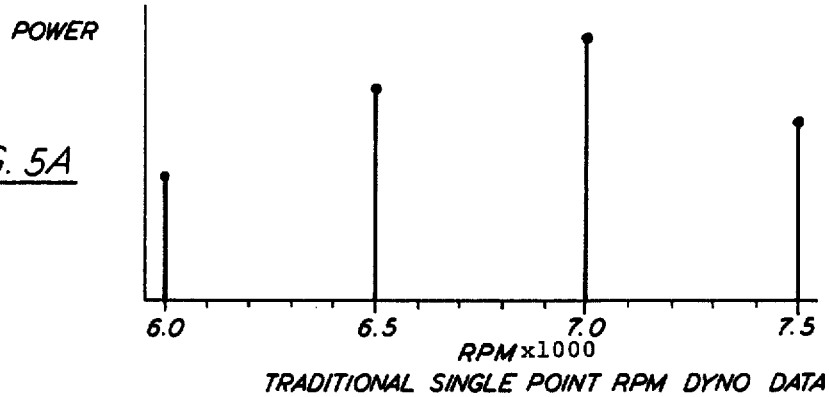
FIGS. 5A, 5B, and 5C are dynomometer plots of power versus RPM for explaining the advantages of this invention.
Figure 5B:
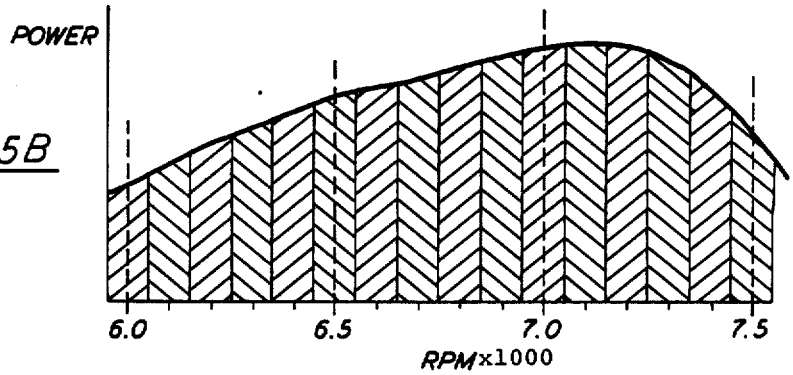
Figure 5C:
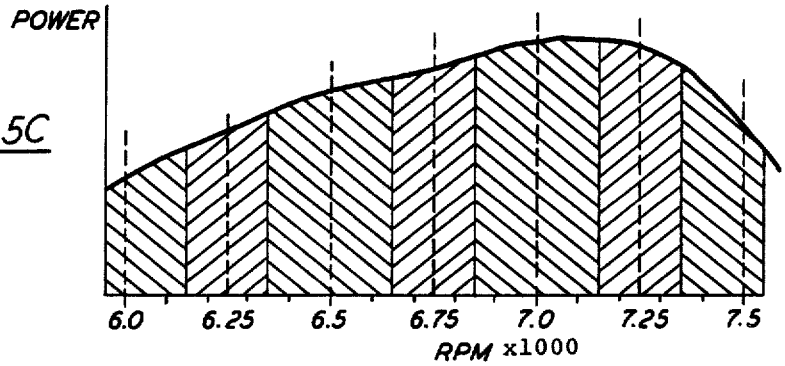

The results of the data obtained with this invention can be explained graphically with reference to FIGS. 5A to 5C.

The curve of FIG. 5A shows the traditional "point" method of taking dynamometer readings. There are discrete readings of data at separate 500 RPM points. There is much information missing. Also, the individual readings are not as accurate as can be obtained under this invention, because the RPM reading may not be exact and the torque or power readings whether visual or electronic, will contain normal statistical fluctuations. The errors involved here, systematic and statistical, limit the repeatability. Engines that are tuned based on this "point test" data may seem to improve performance at the 500 RPM points, but may actually be losing performance between the points. For any serious engine development, one needs to see positively all small performance changes, but the dynamometer test can be tedious and frustrating if the point test method is used.

Curves that show data taken according to the technique of this invention are shown in FIGS. 5B and 5C. This invention deals with integration of readings, and thus area under curves. Consequently, this technique provides the most complete information on real engine performance, because real-world engines accelerate smoothly across bands of engine speeds, and do not remain set on some multiple of 500 RPM. In a 100 RPM band line printout mode (FIG. 5B) the area under the curve is split into 100 RPM strips. This gives optimum RPM resolution and data accuracy. The data on this curve represent the average of the data over respective 100 RPM bands centered on the printed engine speed value. The band-centered data are much more representative of acceleration through this range of RPM in competition.

The curve of FIG. 5C illustrates the data averages contained in a 250 RPM line printout. Even though the printout is compacted into fewer bands (i.e., fewer lines), each represents a wider averaging band, so no information is lost. The printed data in this mode are not necessarily comparable with the data in the 100 RPM line mode. An advantage of the 250 RPM line mode is that the test can be swept at a faster rate because of the wider bands. The engine can be accelerated as fast as 350 RPM/sec. and will still provide sufficient samples, albeit in wider bands, for an accurate printout.

In both the 100 and 250 RPM band modes, the data will clearly indicate if a change will help or hurt engine performance. The mean/average printouts, showing a sweep over a number of 100 RPM bands, will indicate race track performance, whether the object is to maximize average torque or average power. These data can be further analyzed to find optimum gear ratios and shift points for winning performance.

While the invention has been described in detail with reference to a specific embodiment, it should be understood that the invention is not limited to that specific embodiment, but that many modifications and variations would present themselves to those of skill in the art without departing from the scope and spirit of this invention.

What is claimed is:

1. A method of automatically measuring the torque of an engine that has a rotating power shaft, the method employing an automatic data storage and calculating device, sensor means for sensing the rotation of said power shaft and torque sensor means for sensing the torque on said power shaft; the method comprising:

measuring the time that elapses in the intervals between each successive N full revolutions of the power shaft, where N is a predetermined whole number integer; and calculating a corresponding engine speed value from the measured time; sampling the power shaft torque, provided as an integrated torque value from the torque sensor means, for each N-revolution interval;

assigning the sampled integrated torque value to a predetermined RPM speed interval based on the engine speed value associated with said sampled torque value;

computing a statistical mean torque value by combining said sampled torque value with any previous torque values for the same RPM speed interval;

storing the statistical mean torque value and the number of samples for each of said RPM intervals; and listing the stored statistical mean torque values for the associated RPM speed intervals.

2. The method of claim 1 in which said samples are taken continuously at each said N-revolution interval.

3. The method of claim 1 in which said speed intervals have a width of substantially 100 RPM.

4. The method of claim 2 in which during the substantially continuous sampling said engine is subjected to a speed rate of change of approximately 100 RPM per second.

5. The method of claim 1 further comprising storing a value corresponding to the average of all the measured engine speed values for each said RPM speed interval, and deskewing the corresponding statistical mean torque values on the basis of the associated stored engine speed values.

6. The method of claim 5 wherein said deskewing is carried out as follows for each given RPM speed interval (i) Taking the difference between the statistical mean torque values for the RPM speed intervals next above and next below the given interval;

(ii) Taking the difference between the average of the measured engine speed and a midpoint speed of the associated RPM speed interval;

(iii) Computing a correction factor based on the product of the difference of step (i) and the difference of step (ii); and (iv) Adding the correction factor of step (iii) to the statistical mean torque value of the RPM speed interval to produce a deskewed torque value.

7. The method of claim 1 in which said integer N is even so that where the engine is a four-stroke engine, each cylinder of the engine will have the same number of power strokes for every N-revolution interval.

8. The method of claim 1 further comprising averaging the statistical mean torque values for a test run band that is composed of a plurality of consecutive RPM speed intervals to produce a test run average value, and listing the test run average value.

9. A method of automatically measuring the torque of an engine that has a rotating power shaft, the method employing an automatic data storage and calculating device, sensor means for sensing rotation of said shaft and torque sensor means for sensing the torque on said power shaft; said engine and said torque sensor means having a given rotational inertia, the method comprising:

continuously accelerating said engine at not less than a predetermined negative rate but not more than a predetermined maximum positive rate such that the engine is accelerated smoothly through an operating test range;

sampling said torque sensor means and said rotation sensor means automatically as said engine is being accelerated through said test range to produce at least one torque value and at least one corresponding engine speed value for each of a plurality of RPM speed intervals of a given width;

automatically adjusting the torque values by a factor which increases the torque value when the acceleration is positive and decreases the same when the acceleration is negative to compensate for the fact that the rotational inertia of the system that includes the engine and torque sensor means absorbs torque during acceleration and releases torque during deceleration;

writing into a memory of said storage and calculating device a value based on the adjusted torque value for each said engine speed interval; and after accelerating the engine through said test range, printing, for each engine speed interval, a value corresponding to the at least one adjusted torque value associated therewith as stored in said memory.

10. A method of automatically measuring the torque of an engine that has a rotating power shaft the method employing an automatic data storage and calculating device, sensor means for sensing the rotation of said power shaft and torque sensor means for sensing the torque on said power shaft; the method comprising:

measuring the time that elapses in the intervals between each successive N full revolutions of the power shaft, where N is a predetermined whole number integer, and calculating a corresponding engine speed value from the measured time;

sampling the power shaft torque, provided as an integrated torque value from the torque sensor means, during each N-revolution interval;

assigning each sampled torque value to a predetermined RPM speed interval based on the engine speed value associated with said sampled torque value;

storing for each said RPM speed interval at least one value corresponding to the sampled torque values associated therewith; and listing the stored values for the associated RPM intervals.

11. A method of automatically measuring a performance factor for an engine that has a rotating power shaft where the performance factor is dependent upon the speed of the power shaft, the method employing an automatic data storage and calculating device, sensor means for sensing the rotation of the power shaft, and sensor means for sensing the magnitude of said measuring the speed of rotation of said power shaft during predetermined intervals, based on the number of revolutions occurring in said interval and the length of time of said interval;

sampling the performance factor, provided as a value from the performance factor sensor means, during each said interval;

assigning the sampled performance factor value to a predetermined RPM speed band based on the engine power shaft speed during the associated interval;

computing a statistical mean value of the performance factor by combining the sampled performance factor values taken for each given RPM speed band;

computing, for each [,] RPM speed band a statistical mean RPM speed value for all of the samples associated with each said RPM speed band;

storing, for each RPM speed band, the statistical average performance factor value, and the statistical mean [RP] *RPM* speed value associated therewith; and deskewing the stored statistical means performance factor values on the basis of the stored engine speed values to correct for differences between the statistical mean engine speed value of a given RPM speed band and the center RPM value of that band.

12. The method of claim 11 in which said deskewing is carried out as follows:

(i) Taking the difference between the statistical means performance factor values of the RPM speed bands next above and next below each given RPM speed band;

(ii) Taking the difference between the statistical mean engine speed value of each given RPM speed band and the center RPM value of that band;

(iii) Computing a deskewing factor based on the product of the difference of step (i) and the difference of step (ii); and (iv) Adding the deskewing factor of step (iii) to the statistical mean performance factor value for each said RPM speed band to produce a deskewed value of said power factor.

13. Apparatus for automatically measuring a performance factor for an engine that has a rotating power shaft where the performance factor is dependent upon the speed of the engine power shaft, comprising sensor means for detecting the rotation of the power shaft, sensor means for detecting the magnitude of the performance factor of the power shaft at a given time, and an automatic data storage and calculating device coupled to each of said sensor means and configured so as to include means for measuring the speed of rotation of the power shaft by measuring the amount of time that elapses in an interval between each successive N full revolutions of the power shaft where N is a predetermined integer, means for sampling and holding the performance factor during each said interval as a value derived from the performance factor sensor means, means for adjusting the sampled performance factor upwards when the engine is undergoing acceleration and downwards when the engine is undergoing deceleration; means for assigning the adjusted sampled performance factors to predetermined RPM speed bands based on the engine power shaft speed during the associated intervals; and means for listing for each said RPM speed band a performance factor value corresponding to the adjusted sampled performance factor values associated therewith.

14. Apparatus according to claim 13 further comprising means for continuously storing and averaging the adjusted sampled performance factor values for each said RPM speed band so as to produce a statistical mean value of the performance factor for each such band.

15. Apparatus according to claim 14 further comprising means for deskewing the statistical mean adjusted performance factors including means for recording engine speed values during the recording of each sampled performance factor value, and adjusting the statistical mean performance factor values an amount based on the difference between the recorded engine speed values and the center value of the associated RPM band.

16. Apparatus according to claim 11, further comprising means for averaging each said performance factor over a test run band that contains a plurality of said RPM speed bands, and means for automatically listing the test run band average of each said performance factor.

17. Apparatus according to claim 16 in which the test run band average data are listed as a line entry following the listing of the performance factors for the various RPM speed bands.

*18. A method of automatically measuring the torque of an engine that has a rotating power shaft, the method employing an automatic data storage and calculating device, rotation sensor means for sensing the rotation of said power shaft and torque sensor means for sensing the torque in the power shaft, the method comprising:*

*supplying to the data storage and calculating device engine speed values from said rotation sensor means to correspond to the rotation speed of said power shaft and power shaft torque values from said torque sensor means to correspond to the torque on the power shaft at the associated rotation speeds thereof;*

*statistically averaging, for at least one predetermined range of engine speed values, the power shaft torque values associated with those engine speed values, to produce an average torque value for each said range; and*

*visually presenting the average torque values for at least selected ones of said at least one range of engine speed values.*

*19. The method of claim 18 wherein said power shaft rotation speed is changing while said rotation sensor means and said torque sensor means are sensing the rotation speed and torque, respectively, and further comprising automatically adjusting the torque values by a factor which increases the torque value when said power shaft is being accelerated and which decreases the torque value when said power shaft is being decelerated to compensate for the rotational inertia of the engine and torque sensor means which absorbs torque during acceleration and releases torque during deceleration.*

*20. The method of claim 18, further comprising storing a value corresponding to the average of all the measured engine rotation speed values for each said range of engine speed values, and deskewing the corresponding average torque values on the basis of the stored engine speed values.*

*21. The method of claim 10 wherein said deskewing is carried out as follows for each given speed range:*

*(i) Taking the difference between the average torque values for the speed ranges next above and next below the given interval;*

*(ii) Taking the difference between the average of the measured engine speed and a midpoint speed of the associated speed range;*

*(iii) Computing a correction factor based on the product of the difference of step (i) and the difference of step (ii); and*

*(iv) Adding the correction factor of step (iii) to the statistical average torque value of the speed range to produce a deskewed torque value.*

* * * * *